United States Patent [19]

Helgeland

[11] Patent Number: 4,690,362
[45] Date of Patent: Sep. 1, 1987

[54] ADJUSTABLE STAND FOR A VISUAL DISPLAY UNIT

[75] Inventor: Olav Helgeland, Nittedal, Norway

[73] Assignee: Tangberg Data A/S, Oslo, Norway

[21] Appl. No.: 741,353

[22] Filed: Jun. 5, 1985

[30] Foreign Application Priority Data

Jun. 26, 1984 [DE] Fed. Rep. of Germany ....... 3423549

[51] Int. Cl.$^4$ .............................................. A47G 29/00
[52] U.S. Cl. .................................... 248/404; 248/183; 248/349; 248/1
[58] Field of Search ............... 248/183, 405, 404, 1 C, 248/1 E, 188.4, 406.1, 406.2, 1 A, 1 F, 1 I, 1 J, 349, 123.1; 108/147

[56] References Cited

U.S. PATENT DOCUMENTS

| 944,560 | 12/1909 | Joseph | 108/147 |
| 2,512,068 | 6/1950 | Mayo | 248/405 |
| 2,890,010 | 6/1959 | Barkheimer | 248/1 C |
| 2,893,470 | 7/1959 | Peller | 248/405 |
| 3,880,096 | 4/1975 | Kaplan | 248/405 |
| 4,395,010 | 7/1983 | Helgeland | 248/123.1 |
| 4,561,619 | 12/1985 | Robillard | 248/1 E |

Primary Examiner—Reinaldo P. Machado
Assistant Examiner—Alvin Chin-Shue
Attorney, Agent, or Firm—Hill, Van Santen, Steadman & Simpson

[57] ABSTRACT

An adjustable height stand for a visual display unit incorporates a column adjustably mounted within a base part, with a gear train for effecting vertical adjustment. The gear train incorporates a helical gear arranged with its axis in parallel with the column, and cooperates with a gear part mounted to the column. The helical gear may be rotated by a hand wheel through a gear train incorporating a pair of meshing bevel gears. Alternatively, the helical gear may be driven by a motor. The stand is rotatable relative to the work surface about a vertical axis, and the visual display unit is tiltable relative to the support. The spring is provided for compensating for the weight of the visual display unit.

10 Claims, 4 Drawing Figures

ADJUSTABLE STAND FOR A VISUAL DISPLAY UNIT

BACKGROUND OF THE INVENTION

1. Field of the Invention

The present invention relates to an adjustable stand for visual display unit and more particularly to a stand in which the height of the visual display unit is adjustable.

2. The Prior Art

As described in the German Pat. No. 3036852, an adjustable height stand for visual display unit has a stationary base portion and a support for the visual display unit which is adjustable relative to the base portion by means of a gear. The gear is formed from a toothed rack arranged in a direction perpendicular to the support part, and a hand rotatable toothed wheel is arranged on the base portion. When the hand wheel is rotated, the support is moved relative to the base. A gas pressure spring is provided for compensation for the weight of the visual display unit, between the support and the base. The support also has a rotary plate in order to make possible rotation and inclination of the visual display unit.

It is desirable to improve the construction of the adjustable height stand particularly to reduce the cost of its construction, and to satisfy the standard requirements for height adjustability provided for in DIN 66234, part 6.

BRIEF DESCRIPTION OF THE INVENTION

It is a principal object of the present invention to provide an adjustable height stand in which the range of adjustability is improved, and the cost of manufacturing is reduced.

In accordance with the present invention, the stand incorporates a worm wheel and a corresponding gear, which parts remain self-locking in the adjusted position. This makes it possible to dispense with the break on the hand wheel. The stand of the present invention has a greater range of height adjustability, and can be designed in a relatively slender and attractive configuration. In particular, the stand referred to in the above-identified German patent has an adjustability of only 9 cm, while an embodiment of the present invention has a height adjustability of 11 cm.

In an embodiment of the invention, the gears are arranged on the column in the form of an externally pointed female thread, and is arranged in a lateral recess of the column, which is engaged by a helical gear. It is also possible to employ a toothed rack on the column and to substitute a worm gear for the helical gear wheel.

In a particularly simple construction of the present invention, the column is cylindrically designed, and the guide for vertical movement incorporates an open end in the base portion which is matched to the column.

Although it is possible to use a gas spring for eight compensation, it has been found to be more cost favorable to employ a coil spring between the base portion and the support portion. The coil spring is preferably arranged concentrically to the guide rod. Preferably an intermediate gear is designed in the form of a bevel gear, so that one bevel gear is connected to a hand wheel and the second cooperating bevel gear drives the helical gear wheel.

Rotatability of the stand (up to 360°) is achieved by rotatably mounting the base plate on a rotary plate supported on the work surface.

To facilitate assembly, the helical gear wheel and the intermediate gear are arranged on a support part between the column and the base.

It is possible to incline the visual display unit by means of an articulated connection between the support and a bearing bracket arranged on the upper end of the column.

BRIEF DESCRIPTION OF THE DRAWINGS

Reference will now be made to the accompanying drawings in which.

DESCRIPTION OF THE PREFERRED EMBODIMENTS

Figure 1:
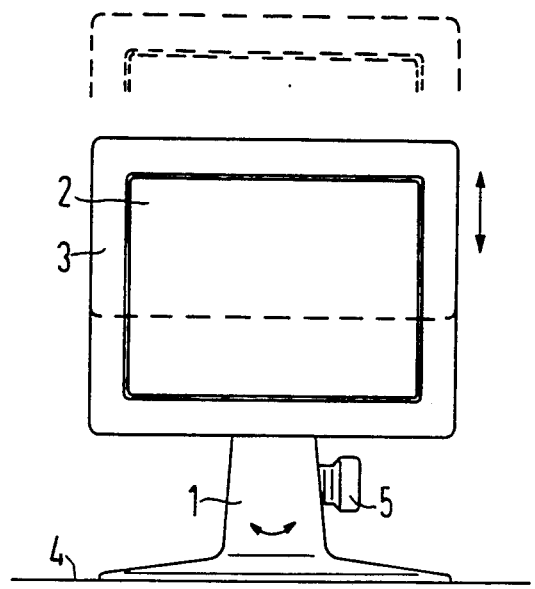
FIG. 1 illustrates a front view of an illustrative embodiment of the present invention, in combination with a visual display unit.
Figure 2:
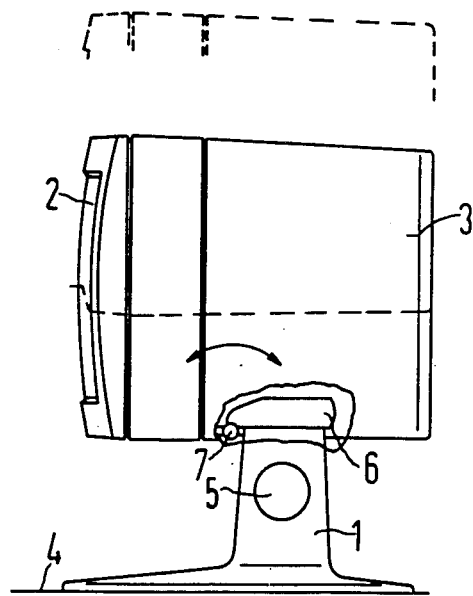
FIG. 2 is a side elevational view of the apparatus of FIG. 1.

Referring now to the drawings, a height adjustable stand is illustrated in FIGS. 1 and 2, having a visual display unit 3 with a viewing screen 2. A stand 1 is supported on a work surface 4, and in turn supports the visual display unit 3. The height of the visual display unit above the work surface 4 may be altered by rotating a hand wheel 5. The range of height adjustability is illustrated in FIGS. 1 and 2 by the solid and dashed line positions.

If desired, the stand 1 can be designed to be rotatable about a vertical axis, so that the visual display unit 3 may be rotated to any desired extent.

As shown in FIG. 2, the visual display unit 3 may also be inclined. For this purpose, pivot pin 7 are provided on both sides of a bearing bracket 6 arranged on the support part of the stand, which pivot pin engage in corresponding bores of the visual display unit 3. The visual display unit 3 is inclinable about these pivot pin 7, so that together with the height adjustability and the rotatability, an optimum arrangement of the visual display unit is rendered possible.

Figure 3:
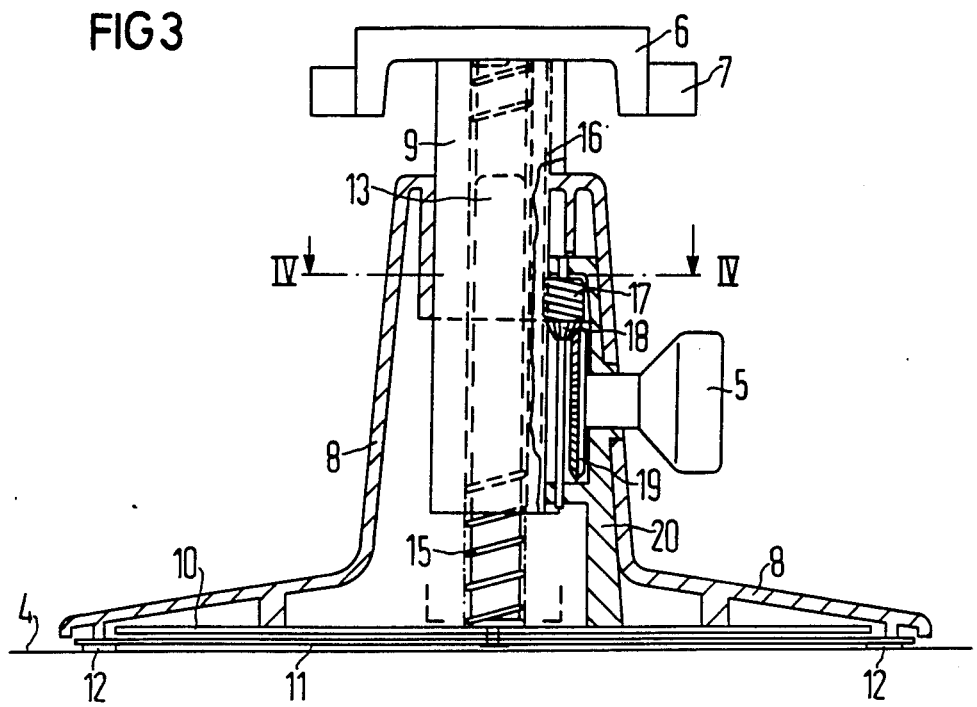
FIG. 3 is a vertical cross-sectional view of the apparatus of FIGS. 1 and 2, taken through the column.

As shown in FIG. 3, the stand 1 has a base portion surrounded by housing 8 and a column 9 guided in the base portion, with a support part comprising the bearing bracket 6 secured to the top of the column 9. The housing 8 is connected to a base plate 10 which is rotatably mounted on a rotary plate 11. The rotary plate stands on the work surface 4 by means of rubber feet 12. In the center of the base plate 10 a guide rod 13 is arranged in a vertical position, and also serves as a spring guide. Between the bearing bracket 6 and the base plate 10 a helical coil spring 15 is arranged surrounding the guide rod 13. This spring acts as a weight compensation for the visual display unit 3 and the support part 6. Alternatively, a gas pressure spring may be provided instead of the helical spring 15.

The height adjustable feature includes a gear 16 disposed adjacent the column 9 and which is driven by a helical gear 17. The helical gear 17 may be rotated by means of a drive motor (not shown), or by an additional gear train incorporating two meshed bevel gears 18 and 19, one of which is connected to a hand wheel 5 for manual rotation. The other bevel gear 18 is fixed to one end of the helical gear 17. The gears 17-19 are mounted on a bracket 20 which is located inside the housing 8 and has its bottom secured to the base plate 10.

In a prererred embodiment, the helical gear 17 has a left trapezoidal (or acme) thread in order to provide for lifting motion in response to the clockwise rotation of the hand wheel 5. The thread part 16 which is secured to the column 9 is designed as a femjle thread. In operation, when the hand wheel 5 is rotated, the gears 17, 18 and 19 are rotated, and the column 9 and the support prt 6 are raised and lowered by virtue of cooperation between the thread part 16 and the helical gear 17. Vertical movement of the column 9 is guided through an opening at the top of the housing 8, and with the downwardly extending flange conforming cross-sectional shape of the column 9.

The helical gear 17 may be substituted by a worm gear if desired, in which case the gear part 16 is designed as a toothed rack. The adjustability proceeds in the same manner, namely the column 9 moving in a vertical direction in response to cooperation between the toothed rack and the worm gear, as the hand wheel is turned. In both instances, the height of the visual display unit 3 may readily be adjusted by means of the hand wheel 5.

Rotation of the visual display unit about a vertical axis is made possible by the rotary plate 11 on which the base plate 10 and the housing 8 are mounted. As already described, inclinability of e visual display unit is achieved by pivoting the unit about the pivot pin 7.

Figure 4:
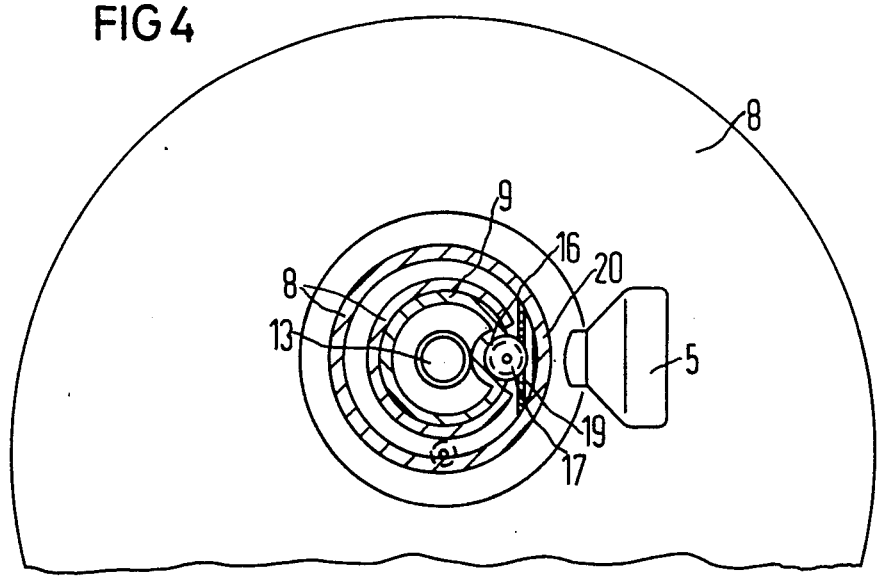
FIG. 4 shows a horizontal cross-sectional view of the apparatus of FIG. 3 taken along section line IV—IV.

FIG. 4, which is a horizontal section through the assembly at the location of the gear 17, illustrates how the helical gear wheel 17 engages the female thread of the gear part 16. The gear part 16 is secured to the column 9 and arranged in a longitudinal recess thereof.

The female threads of the gear part 16 need not conform to the shape of the recess in the column 9. For example, it is possible to form the recess in the shape of a rectangular slot, with the gear part 16 inserted therein and fixed to the ccolumn 9.

It will be apparent that other modifications and additions may be made in the apparatus of the present invention without departing from the essential features of novelty thereof which are intended to defined by the appended claims.

What is claimed is:

1. An adjustable height stand for a visual display unit comprising a base part disposed on a work surface, and a support part capable of being moved relative to said base part, said support part having a column and a bearing bracket connected to said column for securing and supporting said visual display unit, and adjustment means interconnected between said base part and said support part, comprising a helical drive gear connected to said base part and spaced from the side of said column and axially aligned with the displacement direction of the column, a second gear cooperating with said helical drive gear, said second gear comprising an externally directed female thread connected to said column and arranged parallel thereto, side by side with said drive gear, whereby said column is moved longitudinally in response to rotation of said drive gear, and a spring interposed between said base part and said support part within said column for compensating for the weight of said visual display unit.

2. Apparatus according to claim 1 including a plate interposed between said base part and said work surface, and means for mounting said base part for rotation on said plate whereby said base part and support part may be rotated relative to said plate and to said work surface.

3. Apparatus according to claim 1 including a housing having an opening for guiding longitudinal motion of said column relative to said base part.

4. Apparatus according to claim 1 wherein said column has a cylindrical cross-section.

5. Apparatus according to claim 1 including a further gear intermeshed with said helical gear, said further gear being connected to a hand wheel to allow manual rotation thereof.

6. Apparatus according to claim 5 wherein said further gear comprises a gear train having two meshing bevel gears, one of said bevel gears being connected with said hand wheel for rotation therewith, and the other bevel gear being connected for rotation with said helical gear.

7. Apparatus according to claim 1 wherein said spring comprises a helical coil spring interposed between said wcrk surface and said support part.

8. Apparatus according to claim 8 including a guide rod interposed between said work surface and said support part, said spring being coiled about said guide rod.

9. Apparatus according to claim 1 a housing and means for mounting said helical gear between said column and said housing.

10. Apparatus according to claim 9 including an additional gear for driving said helical gear, said additional gear being rotatably mounted on said base part.

* * * * *